US008909844B2

(12) United States Patent
DeCesaris et al.

(10) Patent No.: US 8,909,844 B2
(45) Date of Patent: Dec. 9, 2014

(54) INTER-INTEGRATED CIRCUIT (I2C) MULTIPLEXER SWITCHING AS A FUNCTION OF CLOCK FREQUENCY

(75) Inventors: Michael DeCesaris, Carrboro, NC (US); Luke D. Remis, Raleigh, NC (US); Gregory D. Sellman, Morrisville, NC (US); Steven L. Vanderlinden, Chapel Hill, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 215 days.

(21) Appl. No.: 13/541,750

(22) Filed: Jul. 4, 2012

(65) Prior Publication Data

US 2014/0013151 A1 Jan. 9, 2014

(51) Int. Cl.
*G06F 13/00* (2006.01)

(52) U.S. Cl.
USPC .......................................... 710/316; 710/310

(58) Field of Classification Search
USPC ................................................. 710/305–317
See application file for complete search history.

(56) References Cited

U.S. PATENT DOCUMENTS

| 6,233,635 | B1 | 5/2001 | Son |
| 6,693,678 | B1 * | 2/2004 | Tults et al. ..................... 348/571 |
| 7,493,433 | B2 * | 2/2009 | Behrendt et al. .............. 710/110 |
| 2006/0212634 | A1 * | 9/2006 | Reay et al. .................... 710/300 |
| 2007/0240019 | A1 | 10/2007 | Brady et al. |
| 2007/0250648 | A1 * | 10/2007 | Picard et al. ...................... 710/9 |
| 2008/0183919 | A1 | 7/2008 | Bourne et al. |
| 2009/0125659 | A1 * | 5/2009 | Behrendt et al. .............. 710/110 |
| 2011/0057906 | A1 | 3/2011 | Raynor et al. |
| 2012/0005385 | A1 * | 1/2012 | Hsu ................................. 710/110 |
| 2012/0066423 | A1 * | 3/2012 | Choo et al. .................... 710/110 |
| 2013/0132626 | A1 * | 5/2013 | Furlan ........................... 710/110 |
| 2014/0089544 | A1 * | 3/2014 | Baba ............................. 710/110 |

FOREIGN PATENT DOCUMENTS

| EP | 1533708 | A2 | 5/2005 |
| KR | 2006135329 | A | 12/2006 |

OTHER PUBLICATIONS

Busson et al., "A 1 GHz Digital Channel Multiplexer for Satellite Outdoor Unit", IEE Journal of Solid-State Circuits, Jan. 2010.

* cited by examiner

*Primary Examiner* — Raymond Phan
(74) *Attorney, Agent, or Firm* — Steven M. Greenberg, Esq.; CRGO Law

(57) ABSTRACT

In accordance with one embodiment of the invention, an I2C bus multiplexing circuit for use in an I2C bus interface can be provided. The I2C bus multiplexing circuit can facilitate multiplexer switching in an I2C bus interface by detecting a start command from an I2C master device via an I2C bus, buffering data from the I2C master device, detecting a clock frequency of a bus serial clock (SCL) line of the I2C master device, holding the serial data (SDA) line of the I2C master device in a clock stretch state and selecting a port based on the detected clock frequency of the SCL of the I2C master device. The method further can include sending the buffered data to an I2C slave device on the selected port. The method further can include receiving an acknowledgement from the I2C slave device on the selected port.

19 Claims, 2 Drawing Sheets

INTER-INTEGRATED CIRCUIT (I2C) MULTIPLEXER SWITCHING AS A FUNCTION OF CLOCK FREQUENCY

BACKGROUND OF THE INVENTION

1. Field of the Invention

The present invention relates to bus interfaces and more particularly to providing Inter-Integrated Circuit (I2C) protocol multiplexer switching as a function of clock frequency.

2. Description of the Related Art

Many similarities exist between seemingly unrelated designs in consumer, industrial and telecommunication electronics. Examples of similarities include intelligent control, general-purpose circuits (e.g., LCD drivers, I/O ports, RAM) and application-oriented circuits. The Inter-Integrated Circuit (I2C) bus is a bi-directional two-wire serial bus designed to exploit these similarities.

I2C buses can connect a number of devices simultaneously to the same pair of bus wires. Normally, the device addresses on the I2C bus are predefined by hardwiring on the circuit boards. A limitation of the I2C bus is that it will only allow a single device (e.g., an expansion board) to respond to each even address between 00 and FF. All addresses are even because only the high-order seven bits of the address byte are used for the address. Bit 0 is used to indicate whether the operation is to be a read or a write. Therefore, there are a limited number of addresses that can be assigned to a device.

With the I2C protocol, there is a limitation when mixing devices with different bit rate capacities in a parallel configuration. To avoid this issue, hardware developers can use a switch to isolate fast and standard devices and a general purpose input/output (GPIO) bus expander to control when the switch is opened. Although in some cases this solution will work, this solution still requires the I2C master to have knowledge of the I2C topology in order to keep track of flipping a multiplexer or switch in order to communicate with the correct port. Moreover, such I2C multiplexers require the use of an I2C address.

BRIEF SUMMARY OF THE INVENTION

Embodiments of the present invention address deficiencies of the art in respect to bus interfaces and provide a novel and non-obvious an I2C bus multiplexing circuit for use in an I2C bus interface. In one embodiment of the invention, the I2C bus interface can include an I2C master device coupled to an I2C slave device over an I2C bus. The I2C bus interface also can include an I2C bus multiplexing circuit coupled to the I2C bus between the I2C master device and the I2C slave device. The I2C bus multiplexing circuit can include a buffer coupled to a signal path from the I2C bus and configured to store an I2C signal from the I2C master device. The I2C bus multiplexing circuit further can include a frequency detector additionally coupled to the signal path from the I2C bus configured to detect a clock frequency of the I2C signal from the I2C master device. The I2C bus multiplexing circuit further can include port selection logic coupled to the frequency detector and configured to generate a select control command based on the detected frequency. Finally, the I2C bus multiplexing circuit can include a multiplexer coupled to the buffer and a plurality of ports, the multiplexer configured to route the I2C signal from the I2C master device to one of the plurality of ports.

In one embodiment of the invention, a method for providing inter-integrated circuit (I2C) multiplexer switching as a function of clock frequency is provided. The method can include detecting a start command from an I2C master device via an I2C bus, buffering data from the I2C master device, detecting a frequency of a bus serial clock (SCL) line of the I2C master device, holding the serial data (SDA) line of the I2C master device in a clock stretch state and selecting a port based on the detected clock frequency of the SCL of the I2C master device. The method further can include sending the buffered data to an I2C slave device on the selected port. The method further can include receiving an acknowledgement from the I2C slave device on the selected port.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method and circuit for inter-integrated circuit (I2C) multiplexer switching as a function of clock frequency. In accordance with one embodiment of the invention, an I2C bus multiplexing circuit for use in an I2C bus interface can be provided. The I2C bus multiplexing circuit can facilitate multiplexer switching in an I2C bus interface by detecting a start command from an I2C master device via an I2C bus, buffering data from the I2C master device, detecting a clock frequency of a bus serial clock (SCL) line of the I2C master device, holding the serial data (SDA) line of the I2C master device in a clock stretch state and selecting a port based on the detected frequency of the SCL of the I2C master device. The method further can include sending the buffered data to an I2C slave device on the selected port. The method further can include receiving an acknowledgement from the I2C slave device on the selected port.

In accordance with one embodiment of the invention, the I2C bus interface can include an I2C master device coupled to an I2C slave device over an I2C bus. The I2C bus interface also can include an I2C bus multiplexing circuit coupled to the I2C bus between the I2C master device and the I2C slave device. The I2C bus multiplexing circuit can include a buffer coupled to a signal path from the I2C bus and configured to store an I2C signal from the I2C master device. The I2C bus multiplexing circuit further can include a frequency detector additionally coupled to the signal path from the I2C bus configured to detect a clock frequency of the I2C signal from the I2C master device. The I2C bus multiplexing circuit further can include port selection logic coupled to the frequency detector and configured to generate a select control command based on the detected frequency. Finally, the I2C bus multiplexing circuit can include a multiplexer coupled to the buffer and a plurality of ports, the multiplexer configured to route the I2C signal from the I2C master device to one of the plurality of ports.

Figure 1:
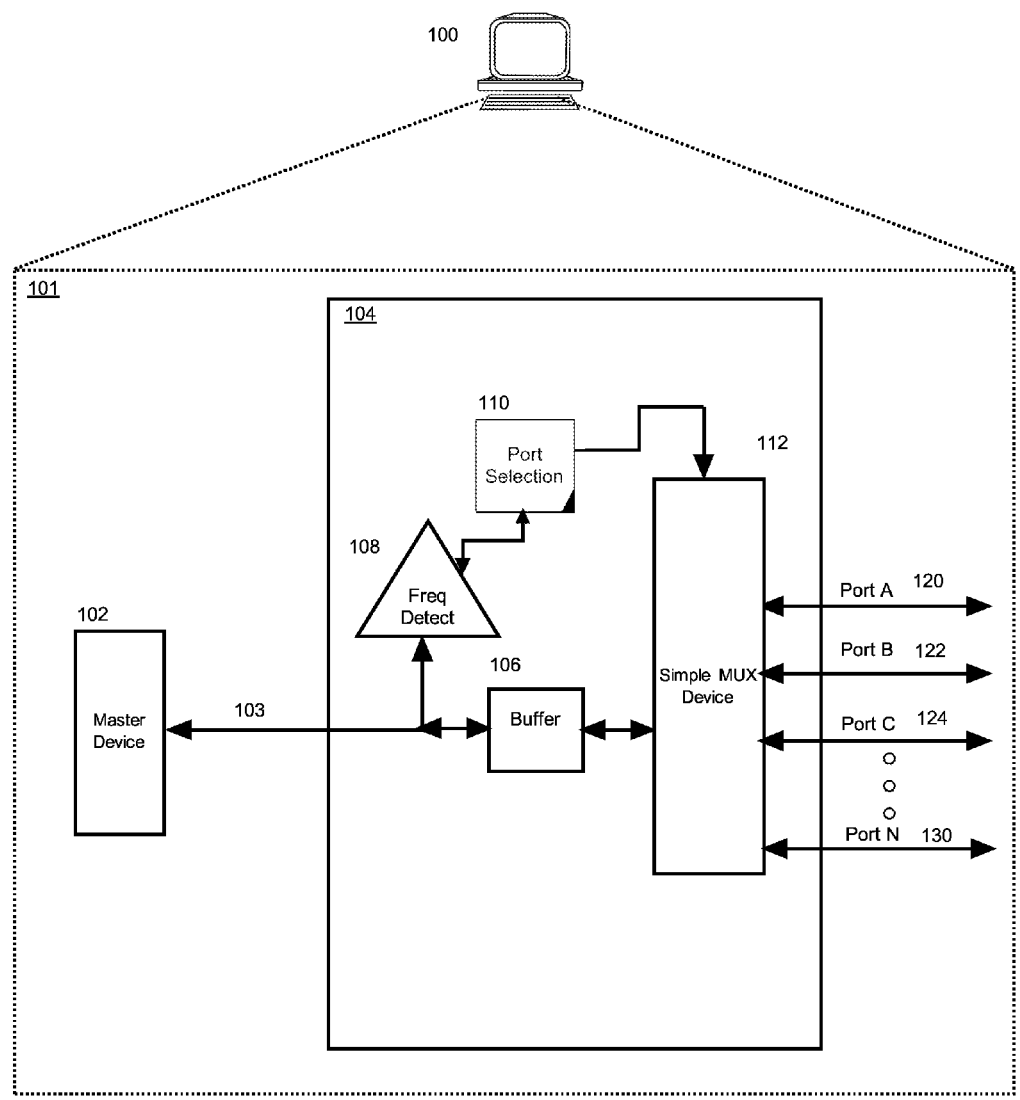
FIG. 1 is a schematic illustration of a data processing system configured to support an I2C bus interface integrated with an I2C bus multiplexing circuit; and, FIG. 2 is a flow chart illustrating a process to provide inter-integrated circuit (I2C) multiplexer switching as a function of clock frequency for the data processing system of FIG. 1.

In illustration, FIG. 1 is a schematic of data processing system that includes a chassis/slot, an input/output (I/O) expansion adapter and an I2C bus interface with an I2C bus multiplexing circuit. Data processing system 100, e.g., a server, can include a chassis/slot 101, an I2C master device 102 and an I2C bus multiplexing circuit 104. In one embodiment, data processing system 100 employs an I2C bus architecture. The I2C bus 103 is a bidirectional serial bus requiring only two wires: serial data line (SDA) and serial clock line (SCL). Although serial buses do not have the throughput capability of parallel buses, serial buses require less wiring and fewer Integrated Circuit (IC) connector pins. Typically, each device (I2C master device 102 and any other I2C compatible devices, such as any I2C slave devices on ports A, B, C and/or up to any number N) connected to I2C bus 103 is software addressable by a unique address. These devices can operate as either transmitters or receivers. However, the I2C bus interface with the I2C bus multiplexing circuit 104 does not require an I2C address as it functions to automatically select an appropriate port A, B, C and/or up to any number N, 120, 122, 124, 130, as a function of the I2C clock speed.

All I2C bus compatible devices have an on-chip interface which allows the devices to communicate directly with each other via the I2C bus 103. A simple master/slave relationship exists at all times. A master is a device which initiates a data transfer and the clock signals to permit the transfer, and any device addressed at the time of transfer is considered a slave. The I2C bus 103 is a multi-master bus, meaning more than one device capable of controlling the bus can be connected to it.

A service processor can include an operating system that supports the operation of port selection logic configured to provide inter-integrated circuit (I2C) multiplexer switching as a function of clock frequency. Port selection logic can include program code enabled to detect a start command from an I2C master device via an I2C bus, to buffer data from the I2C master device, to detect a clock frequency of a bus serial clock (SCL) line of the I2C master device, to hold the serial data (SDA) line of the I2C master device in a clock stretch state and to select a port based on the detected clock frequency of the SCL of the I2C master device. Port selection logic further can include program code enabled to send the buffered data to an I2C slave device on the selected port, to receive an acknowledgement from the I2C slave device on the selected port, to release the SDA line of the I2C master device, to access the selected port with the I2C master device, to detect clock frequencies within an I2C Standard mode and to use clock frequencies within an I2C mode as a control signal to auto select a corresponding port.

In accordance with an embodiment of the present invention, the I2C bus multiplexing circuit 104 can include a buffer 106 coupled to a signal path from the I2C bus 103 and configured to store an I2C signal from the I2C master device 102. The buffer 106 can be implemented in a Field Programmable Gate Array (FPGA) and use First In First Out (FIFO) registers and Random Access Memory (RAM) to buffer the I2C data. The I2C bus multiplexing circuit 104 further can include a frequency detector 108 additionally coupled to the signal path from the I2C bus 103 configured to detect a clock frequency of the I2C signal from the I2C master device 102. Frequency detector 108 can be a conventional Phase Locked Loop (PLL) and/or Delay Locked Loop (DLL) circuit. The I2C bus multiplexing circuit 104 further can include port selection logic 110 coupled to the frequency detector 108 and configured to generate a select control command based on the detected frequency. Finally, the I2C bus multiplexing circuit 104 can include a multiplexer 112 coupled to the buffer 106 and a plurality of ports 120, 122, 124, 130 (A, B, C and/or up to any number N), the multiplexer 112 can be configured to route the I2C signal from the I2C master device to one of the plurality of ports 120, 122, 124, 130 (A, B, C and/or up to any number N). Multiplexer 112 can be implemented using a conventional quick-switch and/or analog multiplexer circuit. In embodiments, multiplexer 112 can be internal to a to a FPGA and/or I2C bus multiplexing circuit 104

Figure 2:
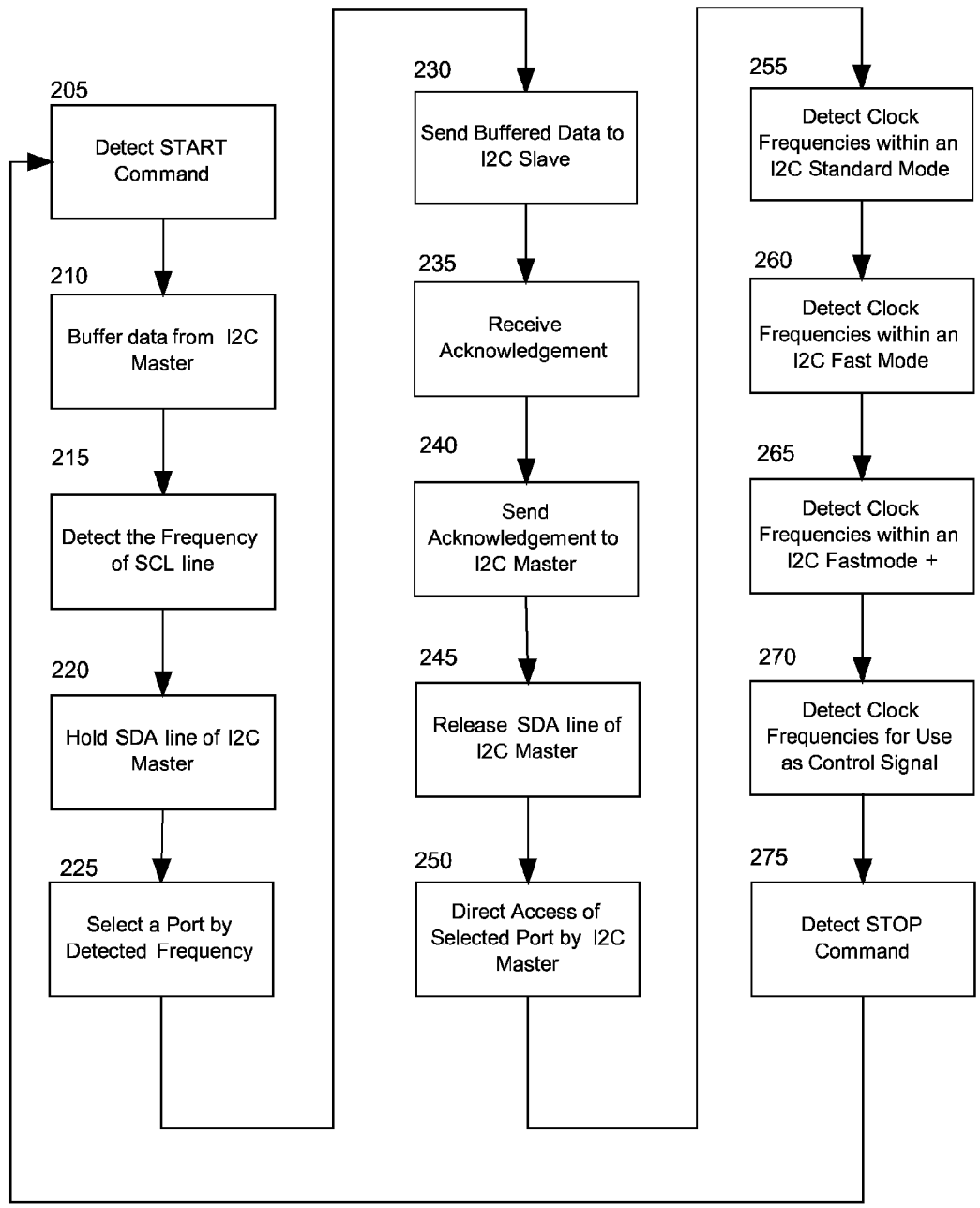

FIG. 2 is a flow chart illustrating a process to provide inter-integrated circuit (I2C) multiplexer switching as a function of clock frequency for the data processing system of FIG. 1. Beginning in block 205, an I2C bus interface with I2C bus multiplexing circuit 104 can detect a START command on the I2C bus 103. In block 210, the I2C bus interface with I2C bus multiplexing circuit 104 can buffer data from a I2C master device 102. In block 215, the I2C bus interface with I2C bus multiplexing circuit 104 can detect the frequency of a bus serial clock (SCL) line of the I2C master device. In block 220, after nine clocks, the I2C bus interface with I2C bus multiplexing circuit 104 can hold the serial data (SDA) line of the I2C master device in a clock stretch state. In block 225, the I2C bus interface with I2C bus multiplexing circuit 104 can select a port based on the detected frequency of the SCL of the I2C master device. In block 230, the I2C bus interface with I2C bus multiplexing circuit 104 can send the buffered data to an I2C slave device on the selected port. In block 235, the I2C bus interface with I2C bus multiplexing circuit 104 can receive an acknowledgement (e.g., either an ACK or NACK) from the I2C slave device on the selected port. In block 240, the I2C bus interface with I2C bus multiplexing circuit 104 can send the acknowledgement (e.g., either an ACK or NACK) from the I2C slave device on the selected port to the I2C master device.

In block 245, the I2C bus interface with I2C bus multiplexing circuit 104 can release the SDA line of the I2C master device. In block 250, the I2C bus interface with I2C bus multiplexing circuit 104 can directly access the selected port with the I2C master device. In block 255, the I2C bus interface with I2C bus multiplexing circuit 104 can detect clock frequencies within an I2C Standard mode. In block 260, the I2C bus interface with I2C bus multiplexing circuit 104 can detect clock frequencies within an I2C fast-mode. In block 265, the I2C bus interface with I2C bus multiplexing circuit 104 can detect clock frequencies within an I2C fast-mode+. In block 270, the I2C bus interface with I2C bus multiplexing circuit 104 can be tuned to detect clock frequencies that are within the same I2C modes and interpret than as a control signal. For instance, instead of the I2C master device 102 writing the control bits inside the I2C bus interface with I2C bus multiplexing circuit 104 to select a port, the I2C master device 102 can increase its clock frequency by 10 kHz (e.g., to 110 kHz) and the I2C bus interface with I2C bus multiplexing circuit 104 will automatically select to Port B (100 kHz=Port A, 110 kHz=Port B, etc.). Notably, using this operating procedure avoids the need to assign an I2C address to the I2C bus interface with I2C bus multiplexing circuit 104. In block 275, the I2C bus interface with I2C bus multiplexing circuit 104 can detect a STOP command on the I2C bus that ends the transmission to free the I2C bus for a new transmission.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. An inter-integrated circuit (I2C) bus interface comprising:
    an I2C master device coupled to an I2C slave device over an I2C bus; and
    an I2C bus multiplexing circuit coupled to the I2C bus between the I2C master device and the an I2C slave device, wherein the I2C bus multiplexing circuit comprises:
    a buffer coupled to a signal path from a I2C bus and configured to store an I2C signal from an I2C master device;
    a frequency detector additionally coupled to the signal path from the I2C bus configured to detect a clock frequency of the I2C signal from the I2C master device;
    port selection logic coupled to the frequency detector and configured to generate a select control command based on the detected clock frequency; and
    a multiplexer coupled to the buffer and a plurality of ports, the multiplexer configured to route the I2C signal from the I2C master device to one of the plurality of ports.

2. The I2C interface of claim 1, wherein the frequency detector is a Phase Locked Loop (Phase Locked Loop) circuit.

3. The I2C interface of claim 1, wherein the buffer is implemented using a Field Programmable Gate Array (FPGA).

4. A method for providing inter-integrated circuit (I2C) multiplexer switching as a function of clock frequency, the method comprising:
    detecting a start command from an I2C master device via an I2C bus;
    buffering data from the I2C master device;
    detecting a clock frequency of a bus serial clock (SCL) line of the I2C master device;
    holding the serial data (SDA) line of the I2C master device in a clock stretch state; and
    selecting a port based on the detected clock frequency of the SCL of the I2C master device.

5. The method of claim 4, further comprising sending the buffered data to an I2C slave device on the selected port.

6. The method of claim 4, further comprising directly accessing the selected port with the I2C master device.

7. The method of claim 4, further comprising detecting clock frequencies within an I2C Standard mode.

8. The method of claim 4, further comprising using clock frequencies within an I2C mode as a control signal to auto select a corresponding port.

9. The method of claim 5, further comprising receiving an acknowledgement from the I2C slave device on the selected port.

10. The method of claim 9, further comprising sending the acknowledgement from the I2C slave device on the selected port to the I2C master device.

11. The method of claim 10, further comprising releasing the SDA line of the I2C master device.

12. A computer program product comprising a computer usable storage medium storing therein computer usable program code for providing inter-integrated circuit (I2C) multiplexer switching as a function of clock frequency, the computer program product comprising:
    computer usable program code for detecting a start command from an I2C master device via an I2C bus;
    computer usable program code for buffering data from the I2C master device;
    computer usable program code for detecting a clock frequency of a bus serial clock (SCL) line of the I2C master device;
    computer usable program code for holding the serial data (SDA) line of the I2C master device in a clock stretch state; and
    computer usable program code for selecting a port based on the detected clock frequency of the SCL of the I2C master device.

13. The computer program product of claim 12, further comprising computer usable code for sending the buffered data to an I2C slave device on the selected port.

14. The computer program product of claim 12, further comprising computer usable code for directly accessing the selected port with the I2C master device.

15. The computer program product of claim 12, further comprising computer usable code for detecting clock frequencies within an I2C Standard mode.

16. The computer program product of claim 12, further comprising computer usable code for using clock frequencies within an I2C mode as a control signal to auto select a corresponding port.

17. The computer program product of claim 13, further comprising computer usable code for receiving an acknowledgement from the I2C slave device on the selected port.

18. The computer program product of claim 17, further comprising computer usable code for sending the acknowledgement from the I2C slave device on the selected port to the I2C master device.

19. The computer program product of claim 18, further comprising computer usable code for releasing the SDA line of the I2C master device.

* * * * *